(12) United States Patent
Kamimura et al.

(10) Patent No.: US 9,809,100 B2
(45) Date of Patent: Nov. 7, 2017

(54) VEHICLE BATTERY MOUNTING STRUCTURE

(71) Applicant: TOYOTA JIDOSHA KABUSHIKI KAISHA, Toyota-shi, Aichi (JP)

(72) Inventors: Shinya Kamimura, Toyota (JP); Kiyoshi Hokazono, Toyota (JP); Shin Terada, Toyota (JP); Tatsuo Hiramatsu, Toyota (JP); Shingo Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/036,091

(22) PCT Filed: Nov. 6, 2014

(86) PCT No.: PCT/JP2014/079496
§ 371 (c)(1),
(2) Date: May 12, 2016

(87) PCT Pub. No.: WO2015/083487
PCT Pub. Date: Jun. 11, 2015

(65) Prior Publication Data
US 2016/0288636 A1 Oct. 6, 2016

(30) Foreign Application Priority Data

Dec. 2, 2013 (JP) .................................. 2013-249391

(51) Int. Cl.
*B62D 1/00* (2006.01)
*B60K 1/04* (2006.01)
(Continued)

(52) U.S. Cl.
CPC .............. *B60K 1/04* (2013.01); *B62D 21/157* (2013.01); *B62D 25/2036* (2013.01); *B60K 2001/0438* (2013.01); *B60Y 2306/01* (2013.01)

(58) Field of Classification Search
CPC ..... B60K 1/04; B62D 21/157; B62D 25/2036
(Continued)

(56) References Cited

U.S. PATENT DOCUMENTS

| 5,725,272 A | 3/1998 | Jones |
| 2011/0143179 A1 | 6/2011 | Nakamori |

(Continued)

FOREIGN PATENT DOCUMENTS

| JP | 2000-501355 A | 2/2000 |
| JP | 2005-254717 A | 9/2005 |

(Continued)

*Primary Examiner* — Joseph D Pape
(74) *Attorney, Agent, or Firm* — Oliff PLC

(57) ABSTRACT

A vehicle battery mounting structure has: a battery frame lower member that is made of resin, and that is disposed at vehicle transverse direction inner sides of energy absorbing members provided at a lower side of a floor panel, and that, together with a battery frame upper member, structures a battery frame that supports a battery; a lower ductile member having a lower main body portion that is joined to vehicle transverse direction outer side end portions of the battery frame lower member, and lower flange portions that are fixed to a bottom surface side of the floor panel; and inclined walls that are formed at vehicle transverse direction outer side end portions of the battery frame lower member, and that are inclined from vehicle transverse direction outer upper sides toward vehicle transverse direction inner lower sides.

5 Claims, 7 Drawing Sheets

(51) Int. Cl.
*B62D 21/15* (2006.01)
*B62D 25/20* (2006.01)

(58) Field of Classification Search
USPC .................................................... 296/187.12
See application file for complete search history.

(56) References Cited

U.S. PATENT DOCUMENTS

2013/0270863 A1* 10/2013 Young ................. B62D 21/157
296/187.12
2016/0107704 A1 4/2016 Terada et al.

FOREIGN PATENT DOCUMENTS

| JP | 2009-221399 A | 10/2009 |
| JP | 2010-032030 A | 2/2010 |
| JP | 2011-124101 A | 6/2011 |
| JP | 2013-256265 A | 12/2013 |
| JP | 2014-080116 A | 5/2014 |
| JP | 2015-009710 A | 1/2015 |
| JP | 2015-013392 A | 1/2015 |

* cited by examiner

VEHICLE BATTERY MOUNTING STRUCTURE

TECHNICAL FIELD

The present invention relates to an vehicle battery mounting structure.

BACKGROUND ART

There is conventionally known a structure in which a battery frame, that accommodates a battery for driving that is disposed at the lower side of the floor portion of an electric automobile, is structured to include a battery tray that is made of resin, and a frame-shaped frame that is made of metal and is provided at the outer wall side of the battery tray (see, for example, Japanese Patent Application Laid-Open (JP-A) No. 2001-124101).

SUMMARY OF INVENTION

Technical Problem

However, when the battery frame has a structure such as described above, there is the concern that breakage will occur at the connected portions of the battery tray to the frame-shaped frame due to collision load that is inputted due to a side collision of the vehicle. In this way, there is room for improvement in the structure that suppresses the occurrence of breakage of a battery frame, that is made of resin, at the time of a side collision of a vehicle.

Thus, an object of the present invention is to obtain a vehicle battery mounting structure that can suppress the occurrence of breakage of a battery frame, that is made of resin, at the time of a side collision of a vehicle.

Solution to Problem

In order to achieve the above-described object, a vehicle battery mounting structure of a first aspect relating to the present invention comprises: a battery frame lower member, the battery frame lower member being made of resin, the battery frame lower member being disposed at vehicle transverse direction inner sides of energy absorbing members provided at a lower side of a floor panel, and the battery frame lower member, together with a battery frame upper member, structuring a battery frame, and the battery frame member supporting a battery; a lower ductile member having: a lower main body portion, the lower main body portion being joined to vehicle transverse direction outer side end portions of the battery frame lower member, and lower flange portions, the lower flange portions being fixed to a bottom surface side of the floor panel; and inclined walls, the inclined walls being formed at the vehicle transverse direction outer side end portions of the battery frame lower member, and the inclined walls being inclined from vehicle transverse direction outer upper sides toward vehicle transverse direction inner lower sides.

In accordance with the first aspect relating to the present invention, the inclined walls, that are inclined from vehicle transverse direction outer upper sides toward vehicle transverse direction inner lower sides, are formed at the vehicle transverse direction outer side end portions of the battery frame lower member to which the lower main body portion is joined. Accordingly, at the time of a side collision of the vehicle, the collision load that is inputted from the energy absorbing member to the battery frame lower member is transmitted along the in-plane directions of the battery frame lower member and the lower main body portion (toward the vehicle transverse direction inner side). Namely, it is difficult for a bending moment in the out-of-plane direction to arise with respect to the battery frame lower member and the lower main body portion. Accordingly, the occurrence of breakage at the battery frame lower member (the battery frame) is suppressed.

Further, a vehicle battery mounting structure of a second aspect relating to the present invention is the vehicle battery mounting structure of the first aspect, wherein portions of the lower main body portion are made to be standing portions, the standing portions gradually separate from the inclined walls while heading from vehicle transverse direction outer sides toward vehicle transverse direction inner sides, and regions between the inclined walls and the standing portions are filled-in and joined by an adhesive.

In accordance with the second aspect relating to the present invention, portions of the lower main body portion are made to be standing portions that gradually separate from the inclined walls while heading from vehicle transverse direction outer sides toward vehicle transverse direction inner sides, and the regions between the inclined walls and the standing portions are filled-in and joined by an adhesive. Namely, the adhesive between the inclined wall and the standing portions is formed to be gradually thicker from the vehicle transverse direction outer side toward the vehicle transverse direction inner side. Accordingly, at the time of a side collision of the vehicle, the collision load that is transmitted along the in-plane directions of the battery frame lower member and the lower main body portion (toward the vehicle transverse direction inner side) is absorbed and reduced by the adhesive that is provided between the inclined wall and the standing portions. Accordingly, the occurrence of breakage at the battery frame lower member (the battery frame) is further suppressed or prevented.

Further, a vehicle battery mounting structure of a third aspect relating to the present invention is the vehicle battery mounting structure of the second aspect, wherein plate members are provided at the standing portions, the plate members projecting-out from vehicle transverse direction inner side end portions of the standing portions toward vehicle transverse direction inner sides.

In accordance with the third aspect relating to the present invention, the plate members, that project-out from the vehicle transverse direction inner side end portions of the standing portions toward vehicle transverse direction inner sides, are provided at these standing portions. Accordingly, even in a case in which the vehicle transverse direction inner side end portions of the standing portions are covered by an adhesive, a water drop that has entered onto the top surface of the standing portion is transmitted along the plate member and runs-off onto the top surface of the battery frame lower member. Accordingly, the occurrence of galvanic corrosion at the standing portions is suppressed.

Further, a vehicle battery mounting structure of a fourth aspect relating to the present invention is the vehicle battery mounting structure of any of the first through third aspects, wherein vertical walls that extend upward are formed at vehicle transverse direction outer side end portions of the inclined walls.

In accordance with the fourth aspect relating to the present invention, the vertical walls that extend upward are formed at the vehicle transverse direction outer side end portions of the inclined walls. Accordingly, at the time of a side collision of the vehicle, the collision load is transmitted efficiently from the energy absorbing member via the vertical wall to the battery frame lower member and the lower main body portion (the battery frame).

Further, a vehicle battery mounting structure of a fifth aspect relating to the present invention is the vehicle battery mounting structure of any of the first through fourth aspects, further comprising an upper ductile member having an upper main body portion and upper flange portions, the upper main body portion being joined to vehicle transverse direction outer side end portions of the battery frame upper member, and the upper flange portions, together with the lower flange portions, being fixed to the bottom surface side of the floor panel, wherein inclined portions are formed at the upper main body portion sides of the upper flange portions, and the inclined portions are inclined from the vehicle transverse direction outer upper sides toward the vehicle transverse direction inner lower sides.

In accordance with the fifth aspect relating to the present invention, the inclined portions, that are inclined from vehicle transverse direction outer upper sides toward vehicle transverse direction inner lower sides, are formed at the upper main body portion sides of the upper flange portions. Accordingly, at the time of a side collision of the vehicle, it is easy for the upper flange portion to bendingly deform with the boundary portion between the upper flange portion and the upper main body portion being the fulcrum, and the stress load that is applied to the battery frame is reduced.

Advantageous Effects of Invention

As described above, in accordance with the first aspect relating to the present invention, at the time of a side collision of a vehicle, the occurrence of breakage at a battery frame that is made of resin can be suppressed.

In accordance with the second aspect relating to the present invention, at the time of a side collision of a vehicle, the occurrence of breakage at a battery frame that is made of resin can be further suppressed or prevented.

In accordance with the third aspect relating to the present invention, the occurrence of galvanic corrosion at standing portions can be suppressed.

In accordance with the fourth aspect relating to the present invention, at the time of a side collision of a vehicle, the collision load can be transferred efficiently from an energy absorbing member to a battery frame.

In accordance with the fifth aspect relating to the present invention, at the time of a side collision of a vehicle, the stress load that is applied to a battery frame can be reduced.

DESCRIPTION OF EMBODIMENTS

An embodiment relating to the present invention is described in detail hereinafter on the basis of the drawings. Note that, for convenience of explanation, arrow UP that is shown appropriately in the respective drawings is the vehicle body upward direction, arrow FR is the vehicle body frontward direction, and arrow IN is the vehicle transverse direction inner side. Further, in the following description, when vertical, longitudinal and left-right directions are used, they mean the vertical of the vehicle body vertical direction, the longitudinal of the vehicle body longitudinal direction, and the left-right of the vehicle body left-right direction (the vehicle transverse direction) unless otherwise indicated. Moreover, although the respective drawings illustrate the left side of the vehicle body, the vehicle body has left-right symmetry and the right side of the vehicle body is the same, and therefore, description of the right side of the vehicle body is omitted when appropriate.

Figure 1:
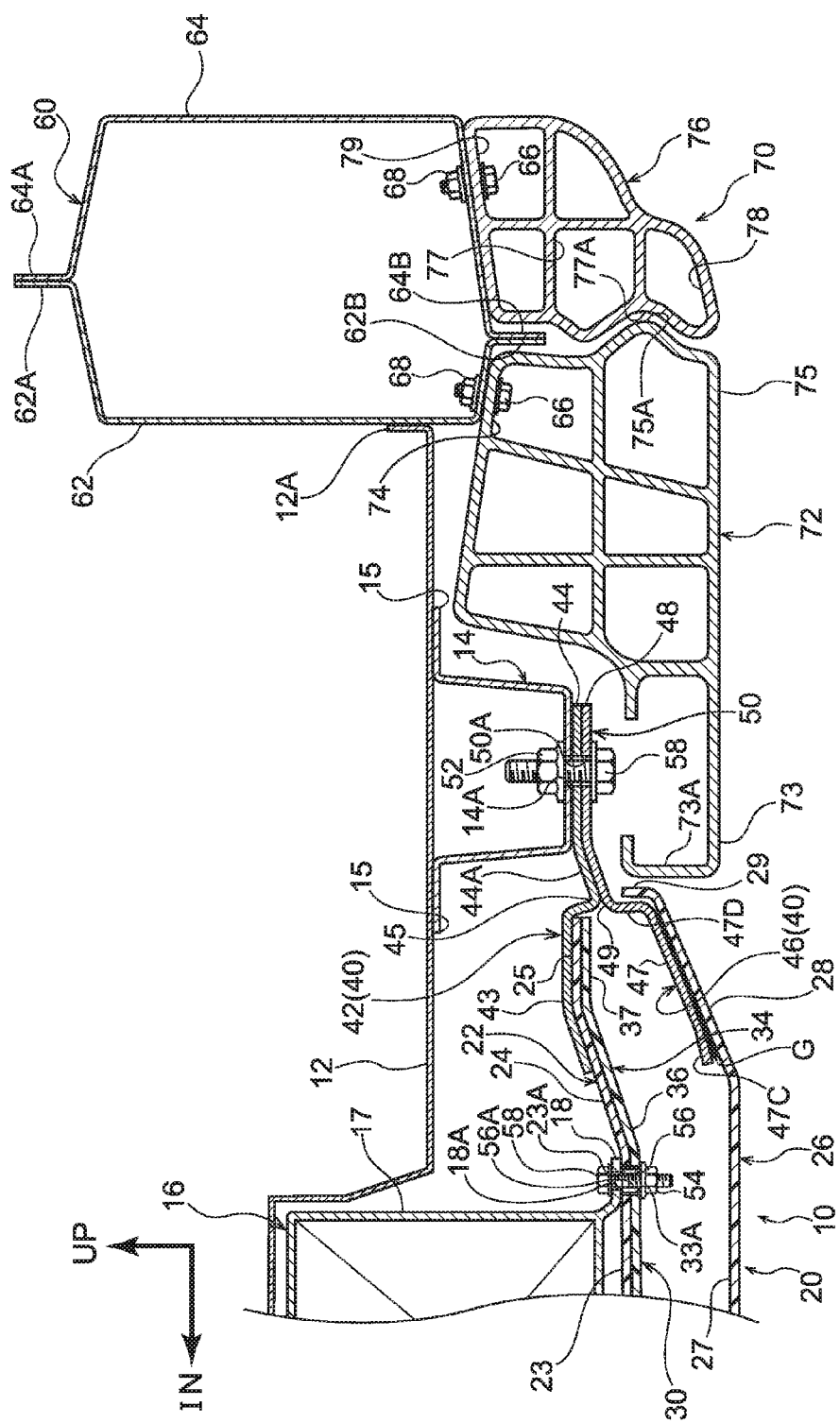
FIG. 1 is a front sectional view showing a vehicle battery mounting structure relating to a present embodiment.

As shown in FIG. 1, a pair of left and right under members (side frames) 14, that extend in the vehicle body longitudinal direction and structure a vehicle body skeleton structure, are joined to the bottom surface of a floor panel 12 that is made of metal and structures the floor portion of a vehicle body. The under members 14 are formed of metal and substantially in the shapes of hats in cross-section, and flange portions 15 that jut-out in the vehicle transverse direction are joined and fixed by welding or the like to the bottom surface, at the vehicle transverse direction both end portion sides, of the floor panel 12.

Further, plural through-holes 14A, for the insertion-through of flange bolts 58 that are described later, are formed in the under member 14 along the length direction thereof (the vehicle body longitudinal direction). Further, weld nuts 52 are provided on the top surface of the under member 14 coaxially with the respective through-holes 14A.

A vehicle battery mounting structure 10, that relates to the present embodiment and that is applied to a vehicle such as an electric automobile or the like, is disposed at the vehicle body lower side of the floor panel 12, and has a battery frame (a stack frame) 20 that supports a fuel cell stack 16, that serves as a battery, from the vehicle body lower side. This battery frame 20 is formed from a fiber reinforced resin (FRP), and, as an example, is formed from a carbon fiber reinforced resin material (CFRP).

An exterior portion 17 of the fuel cell stack 16 is formed of metal (or may be resin) in the shape of a rectangular box, and leg portions 18, that jut-out toward the vehicle transverse direction outer sides, are formed integrally at plural predetermined places of the lower end peripheral edge portion of this exterior portion 17. Further, a through-hole 18A, that is for the insertion-through of the flange bolt 58 that is described later, is formed in each of the leg portions 18.

Figure 2:
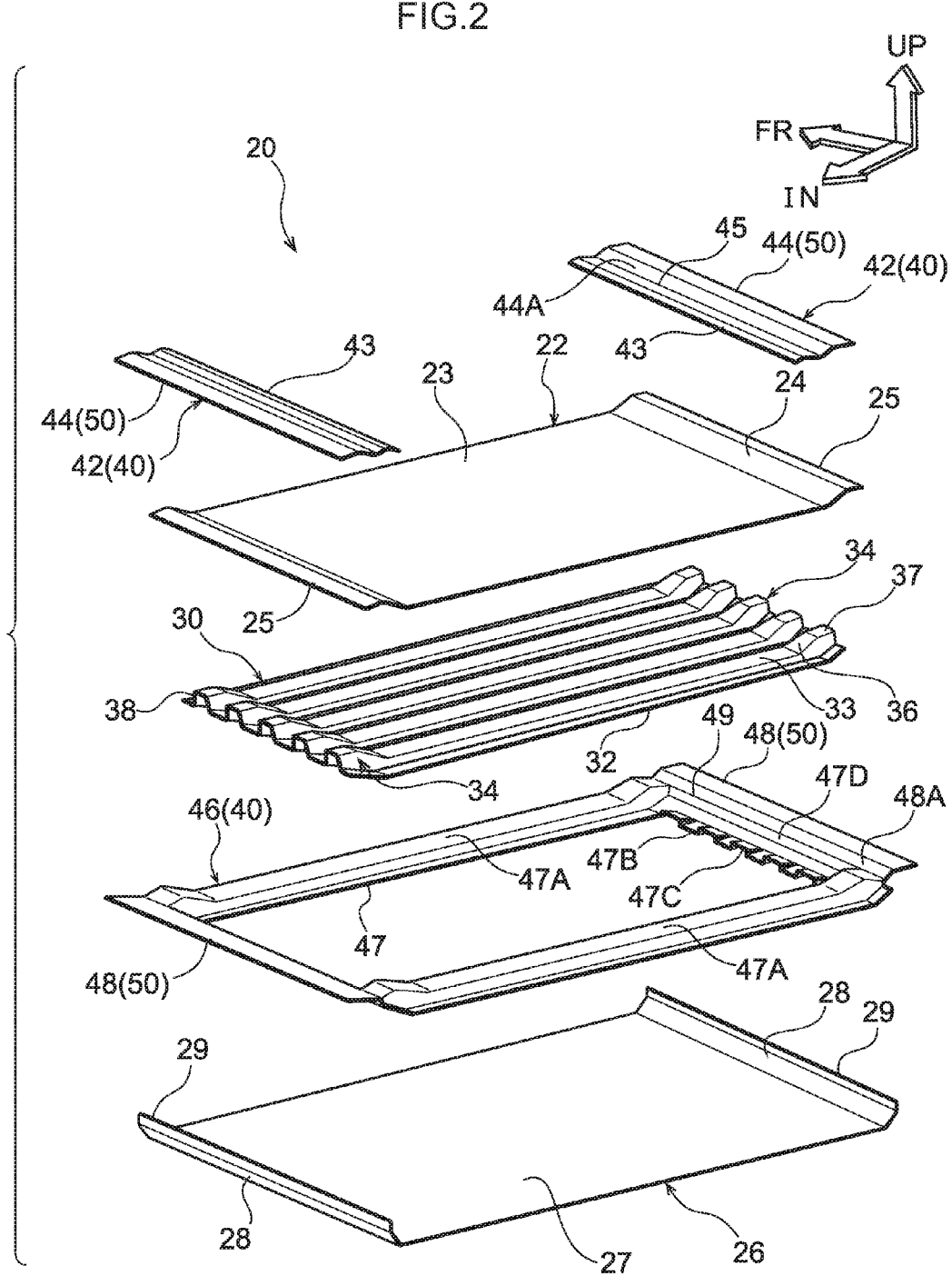
FIG. 2 is an exploded perspective view showing a battery frame and ductile members that structure the vehicle battery mounting structure relating to the present embodiment.

As shown in FIG. 1 and FIG. 2, the battery frame 20 is structured to include an upper frame 22 that serves as a battery frame upper member, a lower frame 26 that serves as a battery frame lower member, and a core frame 30 that serves as an intermediate member (reinforcing member) and that is provided between the upper frame 22 and the lower frame 26.

The upper frame 22 has a top plate 23 that is rectangular flat plate shaped and is disposed along the horizontal direction, inclined walls 24 that are rectangular flat plate shaped and are integrally provided continuously with the vehicle transverse direction both end portions (outer side end portions) of the top plate 23 obliquely upward toward the vehicle transverse direction outer sides so as to run along inclined walls 36 that are described later, and flange portions 25 that are rectangular flat plate shaped and are integrally provided continuously with the vehicle transverse direction both end portions of the inclined walls 24 substantially horizontally toward the vehicle transverse direction outer sides so as to run along top walls 37 that are described later.

The lower frame 26 has a bottom plate 27 that is rectangular flat plate shaped and is disposed along the horizontal direction, inclined walls 28 that are rectangular flat plate shaped and that are integrally provided continuously with the vehicle transverse direction both end portions (outer side end portions) of the bottom plate 27 at inclines so as to be tilted at a predetermined angle toward the vehicle transverse direction outer upper sides (from the vehicle transverse direction outer upper sides toward the vehicle transverse direction inner lower sides), and side wall portions 29 that are rectangular flat plate shaped and serve as vertical walls and are integrally provided continuously and substantially orthogonally toward the vehicle body upper side at the vehicle transverse direction both end portions (outer side end portions) of the inclined walls 28.

Note that the heights of the side wall portions 29 are made to be heights that substantially reach (extend to) the boundary portions 49 between lower flange portions 48 and side wall portions 47D at a lower main body portion 47 of a lower ductile member 46 that is described later, when the lower ductile member 46 is joined to the lower frame 26. In other words, the top end surfaces of the side wall portions 29 are made to be substantially the same height positions as the top end surfaces of block portions 73 at inner members 72 of energy absorbing members 70 that are described later.

As shown in FIG. 2, the core frame 30 has a main body portion 32 at which convex portions 33, that are substantially hat-shaped in cross-section and extend along the vehicle transverse direction, are formed so as to be lined-up in plural rows (e.g., five rows) in the vehicle body longitudinal direction, and projecting portions 34 that are formed at the vehicle transverse direction both end portions of the main body portion 32 so as to be continuous from the top surfaces of the convex portions 33 and project toward the vehicle body upper side.

The vehicle transverse direction inner sides of the projecting portions 34 are made to be the inclined walls 36 that are integrally provided continuously from the top surfaces of the convex portions 33 and extend at inclines upwardly toward the vehicle transverse direction outer upper sides. The top walls 37 that are substantial horizontal are integrally provided continuously with the upper end portions of the inclined walls 36 toward the vehicle transverse direction outer sides. Further, the vehicle transverse direction outer side end portions of the projecting portions 34 are made to be end surface portions 38 that are cross-sections that are substantially orthogonal to the main body portion 32. Namely, the projecting portions 34 are formed in substantially trapezoidal shapes as seen from the vehicle body longitudinal direction (as seen in a front view).

Further, the bottom surface of the top plate 23 of the upper frame 22 is joined by an adhesive to the top surfaces of the respective convex portions 33 of the core frame 30, and the top surface of the bottom plate 27 of the lower frame 26 is joined by an adhesive to the bottom surface of the main body portion 32 of the core frame 30. Due thereto, the battery frame 20 that has a rectangular closed cross-sectional shape is generally structured.

Note that, as shown in FIG. 1, through-holes 23A, 33A that communicate with one another are formed at plural, predetermined positions of the top plate 23 of the upper frame 22 and the convex portions 33 of the core frame 30, and flange nuts 54 are joined by an adhesive to the bottom surfaces of the convex portions 33 coaxially with the respective through-holes 23A, 33A. Further, collar members 56, that are cylindrical and made of metal, are provided integrally and coaxially with the top surfaces of the respective flange nuts 54, and the respective collar members 56 are inserted into the respective through-holes 23A, 33A.

Accordingly, the fuel cell stack 16 is fastened and fixed to the battery frame 20 (the upper frame 22 and the core frame 30) due to the fuel cell stack 16 being placed on the top surface of the upper frame 22 (the top plate 23) such that the through-holes 18A of the leg portions 18 and through-holes 56A of the collar members 56 communicate, and the flange bolts 58 being inserted-through the through-holes 18A and the through-holes 56A from the vehicle body upper side and being screwed-together with the flange nuts 54.

Further, as shown in FIG. 1 and FIG. 2, upper main body portions 43 of a pair of left and right upper ductile members 42 that structure the upper side of a ductile member 40, are respectively joined to the top surfaces of the inclined walls 24 and the flange portions 25 of the upper frame 22. In further detail, the vehicle body longitudinal direction is the length direction of the upper ductile members 42, and the bottom surfaces of the upper main body portions 43, that are the vehicle transverse direction inner side end portions of the upper ductile members 42, are joined by an adhesive to the top surfaces of the inclined walls 24 and the flange portions 25 of the upper frame 22.

Further, upper flange portions 44, that project-out toward the vehicle transverse direction outer sides from the flange portions 25 of the upper frame 22 and the end surface portions 38 (the battery frame 20) of the core frame 30 (i.e., that are the vehicle transverse direction outer side portions of the upper ductile members 42), are provided integrally and continuously with the vehicle transverse direction outer side end portions of the upper main body portions 43.

On the other hand, the lower main body portion 47 of the lower ductile member 46 that structures the lower side of the ductile member 40, is joined to the top surfaces of the respective inclined walls 28 of the lower frame 26. In further detail, the lower ductile member 46 has the lower main body portion 47 that is rectangular frame shaped. The bottom surfaces of overhanging portions 47B (including standing portions 47C) that are described later of the lower main body portion 47 are joined by an adhesive G (see FIG. 1, FIG. 3) to the top surfaces of the inclined walls 28 of the lower frame 26.

Accordingly, the core frame 30 is disposed at the inner side of the lower main body portion 47, and, in this state, the bottom surface of the main body portion 32 is joined by an adhesive to the top surface of the bottom plate 27 of the lower frame 26. Further, the vehicle body longitudinal direction both end portions of the lower main body portion 47 are made to be convex portions 47A that are substantially hat-shaped in cross-section and extend in the vehicle transverse direction. The top surfaces of these convex portions 47A are, together with the top surfaces of the respective convex portions 33 of the core frame 30, joined by an adhesive to the bottom surface of the top plate 23 of the upper frame 22.

Further, the overhanging portions 47B, that are rectangular flat plate shaped and jut-out toward the vehicle transverse direction inner sides at inclines at the same angle as the inclined walls 28 with respect to the horizontal direction (from the vehicle transverse direction outer upper sides toward the vehicle transverse direction inner lower sides), are formed integrally with the vehicle transverse direction both end portions of the lower main body portion 47. Further, the standing portions 47C, that are cut and raised so as to gradually separate from the inclined walls 28 from the vehicle transverse direction outer sides toward the vehicle transverse direction inner sides, are formed at portions of the overhanging portions 47B (the lower main body portion 47) that correspond to (face) the projecting portions 34 of the core frame 30.

Namely, the plural (e.g., five) standing portions 47C are formed so as to bend or curve, at the overhanging portion 47B so as to be separated at a predetermined interval (e.g., at a uniform interval) in the vehicle body longitudinal direction, and the respective standing portions 47C are inserted into the respective projecting portions 34. Further, the bottom surface at the projecting portion 34 sides of the main body portion 32 of the core frame 30 is joined by an adhesive to the top surfaces of the overhanging portions 47B, except for the standing portions 47C. Due thereto, there is a structure in which the overhanging portions 47B, except for the standing portions 47C, are nipped and fixed by the lower frame 26 and the core frame 30.

Figure 3:
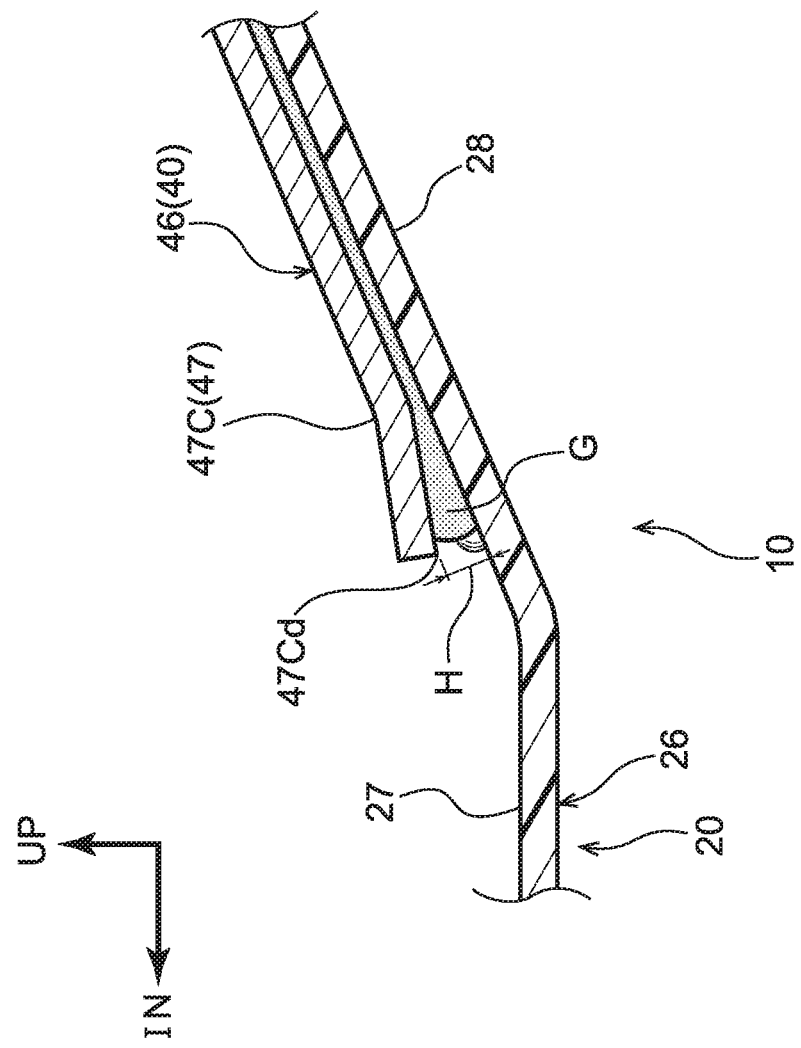
FIG. 3 is a front sectional view showing, in an enlarged manner, a portion of the vehicle battery mounting structure relating to the present embodiment.

Note that, as shown in FIG. 3, the vehicle transverse direction inner side end portions as well of the standing portions 47C are inclined at a predetermined angle from the vehicle transverse direction outer upper sides toward the vehicle transverse direction inner lower sides with respect to the horizontal direction (an angle that is more gradual than the angle of the inclined walls 28). Due thereto, there is a structure in which water drops that have entered into the projecting portions 34 are transferred along the top surfaces of the standing portions 47C, and run-off further toward the vehicle transverse direction inner side than the standing portions 47C. Namely, it is difficult for rust caused by galvanic corrosion to arise at the top surfaces and the vehicle transverse direction inner side end portions (in particular, lower side ridgeline portions 47Cd) of the standing portions 47C.

In further detail, the adhesive G for joining the standing portions 47C to the inclined walls 28 becomes gradually thicker from the vehicle transverse direction outer sides toward the vehicle transverse direction inner sides. Further, maximum thickness at this vehicle transverse direction inner side end portion (an interval between the inclined wall 28 and the lower side ridgeline portion 47Cd at the vehicle transverse direction inner side end portion of the standing portion 47C) H is, for example, H=4.5 mm. Due thereto, there is a structure in which, even if a water drop adheres to the vehicle transverse direction inner side end portion of the adhesive G due to surface tension, that water drop does not contact the lower side ridgeline portion 47Cd of the standing portion 47C.

In other words, the maximum thickness (the interval between the lower side ridgeline portion 47Cd and the inclined wall 28) H at the vehicle transverse direction inner side end portion of the adhesive G is determined such that, even if a water drop adheres to the vehicle transverse direction inner side end portion of the adhesive G due to surface tension, that water drop does not contact the lower side ridgeline portion 47Cd of the standing portion 47C. Due thereto, the generation of rust caused by galvanic corrosion at, in particular, the lower side ridgeline portions 47Cd of the standing portions 47C is suppressed or prevented.

Figure 5:
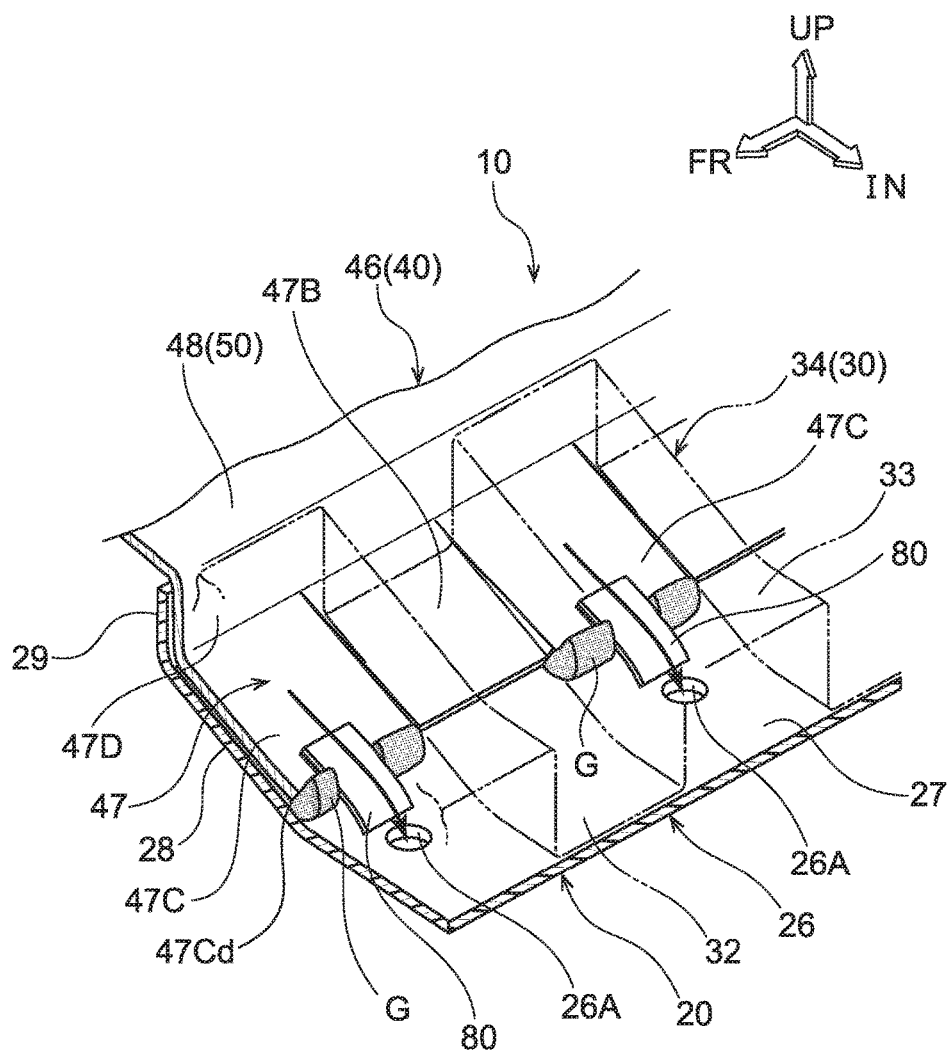
FIG. 5 is a perspective view showing, in an enlarged manner, a portion of the vehicle battery mounting structure relating to the present embodiment.
Figure 6:
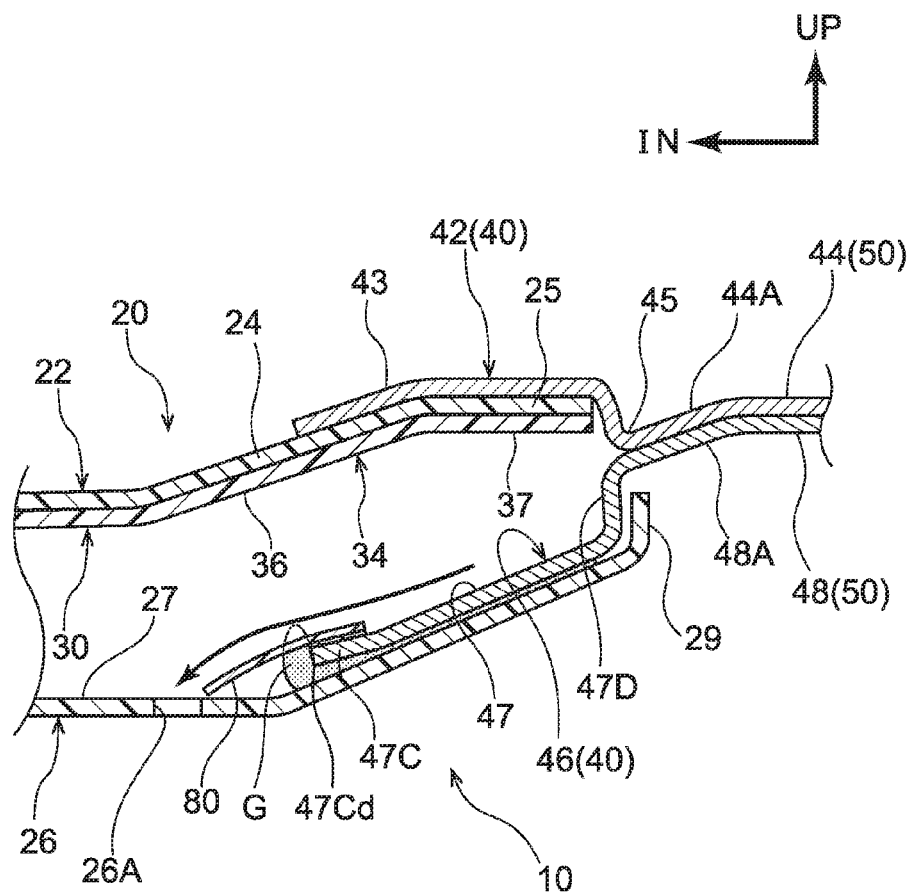
FIG. 6 is a front sectional view showing, in an enlarged manner, a portion of the vehicle battery mounting structure relating to the present embodiment.

Further, as shown in FIG. 5 and FIG. 6, when the standing portions 47C are joined by the adhesive G to the inclined walls 28, the adhesive G may be made to bulge-out from the vehicle transverse direction inner side end portions of the standing portions 47C, and the vehicle transverse direction inner side end portions (in particular, the lower side ridgeline portions 47Cd) of the standing portions 47C may be covered by this adhesive G that has bulged-out and swollen. Due thereto, the generation of rust caused by galvanic corrosion at, in particular, the lower side ridgeline portions 47Cd of the standing portions 47C is suppressed or prevented more.

Note that, at this time, the vehicle transverse direction outer side end portions of plate members 80, that are made of resin and that project-out toward the vehicle transverse direction inner side from the vehicle transverse direction inner side end portions of the standing portions 47C, are affixed in advance by double-sided tape or the like to the top surfaces of the standing portions 47C. With such a structure, the mounds that are portions of the adhesive G that has bulged-out from the vehicle transverse direction inner side end portions of the standing portions 47C, are kept down by the plate members 80. Therefore, water drops that have penetrated into the projecting portions 34 are transmitted along the top surfaces of the standing portions 47C and the top surfaces of the plate members 80, and run-off further toward the vehicle transverse direction inner sides than these plate members 80.

Namely, the path of the water drop that heads from the top surface of the standing portion 47C toward the top surface of the lower frame 26 is formed by the plate member 80, with at least the lower side ridgeline portion 47Cd being in a state of being covered by the adhesive G that has bulged-out and swollen from the vehicle transverse direction inner side end portion of the standing portion 47C. Accordingly, even if there is a structure in which the vehicle transverse direction inner side end portion (in particular, the lower side ridgeline portion 47Cd) of the standing portion 47C is covered by the adhesive a water drop can be prevented from remaining at the top surface of the standing portion 47C, and the generation of rust caused by galvanic corrosion at the top surface of the standing portion 47C is suppressed or prevented.

Note that the thickness of the plate member 80 is made to be, for example, 0.5 mm, and the thickness of the double-sided tape is made to be, for example, 0.2 mm. Further, although the illustrated plate member 80 is affixed to the transverse direction (vehicle longitudinal direction) central portion of the standing portion 47C, the affixed position of the plate member 80 is not limited to this position.

Further, through-holes 26A that are circular for example are formed in the lower frame 26 further toward the vehicle transverse direction inner side than the plate members 80. Accordingly, a water drop, that has been transferred along the top surface of the standing portion 47C or the top surface of the plate member 80 and has run-off onto the top surface of the lower frame 26, is discharged to the exterior of the battery frame 20 from this through-hole 26A.

Further, as shown in FIG. 1 and FIG. 2, the portions, that are further toward the vehicle transverse direction outer sides than the overhanging portions 47B, of the lower main body portion 47 of the lower ductile member 46 are made to be the side wall portions 47D that are formed substantially perpendicularly toward the vehicle body upper side so as to run along the side wall portions 29 of the lower frame 26. Further, the height of these side wall portions 47D is made to be substantially the same height as the side wall portions 29 that are the vehicle transverse direction outer side end portions of the lower frame 26.

Namely, the side wall portions 29 of the lower frame 26 extend toward the vehicle body upper side to as far as a height position that substantially reaches the boundary portions 49 between the side wall portions 47D and the lower flange portions 48 of the lower main body portion 47. Further, the lower flange portions 48, that project-out toward the vehicle transverse direction outer sides from the end surface portions 38 of the core frame 30 and the top end portions at the side wall portions 29 of the lower frame 26 (the battery frame 20), are integrally provided continuously with the vehicle transverse direction outer side end portions of the side wall portions 47D.

Further, the upper flange portions 44 and the lower flange portions 48, that project-out toward the vehicle transverse direction outer sides from the battery frame 20, are superposed together and are joined by an adhesive (or by rivets or the like), and structure flange portions 50 that are regions, that are fixed to the under members 14 (the bottom surface side of the floor panel 12), at the battery frame 20 side. Note that the ductile member 40 (the upper ductile members 42 and the lower ductile member 46) are made of metal, and, as an example, are molded from high tensile steel plates or ultra-high tensile steel plates.

Further, as shown in FIG. 1, plural through-holes 50A, that communicate with one another and are for the insertion-through of the flange bolts 58, are formed along the vehicle body longitudinal direction in the flange portion 50 that is structured by the upper flange portion 44 and the lower flange portion 48. Accordingly, the battery frame 20 is fastened and fixed to the under members 14 via the ductile member 40 (the flange portions 50), due to the flange bolts 58 being inserted-through the through-holes 50A and the through-holes 14A from the vehicle body lower side and being screwed-together with the weld nuts 52.

Further, as shown in FIG. 1 and FIG. 2, inclined portions 44A, that head from the vehicle transverse direction outer upper sides toward the vehicle transverse direction inner lower sides (toward boundary portions 45 between the upper main body portions 43 and the upper flange portions 44), are formed at the upper main body portion 43 sides of the upper flange portions 44 and further toward the vehicle transverse direction outer sides than the battery frame 20. Due to these inclined portions 44A being formed, there is a structure in which the boundary portions 45 become fulcra of the bending deformation, that is described later, of the flange portions 50.

Note that inclined portions 48A, that head from the vehicle transverse direction outer upper sides toward the vehicle transverse direction inner lower sides (toward the boundary portions 49 between the lower main body portion 47 and the lower flange portions 48), also are formed at the lower main body portion 47 sides of the lower flange portions 48 that are superposed and joined with the upper flange portions 44, and further toward the vehicle transverse direction outer sides than the battery frame 20. Due thereto, there is a structure in which the boundary portions 49, together with the boundary portions 45, become fulcra of the bending deformation of the flange portions 50.

Further, as shown in FIG. 1, the vehicle transverse direction outer side end portions of the floor panel 12 are made to be bent portions 12A that are formed so as to be bent toward the vehicle body upper side, and these bent portions 12A are joined by welding or the like to inner panels 62 of rockers 60 that are made of metal. The rocker 60 is structured by comprising the inner panel 62 that is substantially hat-shaped in cross-section, and an outer panel 64 that is substantially hat-shaped in cross-section.

Namely, the rocker 60 is structured in a rectangular closed cross-sectional shape due to an upper flange portion 64A of the outer panel 64 being joined by welding or the like to an upper flange portion 62A of the inner panel 62, and a lower flange portion 64B of the outer panel 64 being joined by welding or the like to a lower flange portion 62B of the inner panel 62.

Further, the energy absorbing members 70 that are made of metal are disposed between the vehicle body lower sides of the rockers 60 (including the vehicle transverse direction both end portions of the floor panel 12) and the battery frame 20. The energy absorbing member 70 is structured to include the inner member 72 that is disposed at the vehicle transverse direction inner side so as to be adjacent to the side wall portion 29, and an outer member 76 that is disposed further toward the vehicle transverse direction outer side than the inner member 72 with a predetermined interval therebetween (an interval of an extent such that the lower flange portions 62B, 64B can be inserted therein).

The inner member 72 is structured in a shape that is such that plural (e.g., seven) block portions, that are substantially rectangular closed cross-sectional shapes (tube shapes) and that extend in the vehicle body longitudinal direction, are combined integrally. A side wall portion 73A, that faces toward the vehicle transverse direction inner side, of the block portion 73 that is at the vehicle transverse direction innermost side is disposed adjacent to the side wall portion 29 (is disposed so as to face the side wall portion 29 with a slight interval in the vehicle transverse direction therebetween).

Further, the block portion 73 is fastened and fixed by unillustrated bolts and weld nuts to the under member 14 except for the fastening regions of the flange portion 50. A block portion 74, that is at the vehicle transverse direction outermost side and at the upper portion side, is fastened and fixed by bolts 66 and weld nuts 68 to the inner panel 62 of the rocker 60. Due thereto, the inner members 72 are disposed at the vehicle body lower sides of the vehicle transverse direction both end portions of the floor panel 12.

The outer member 76 is structured in a shape that is such that plural (e.g., five) block portions, that are substantially rectangular closed cross-sectional shapes (tube shapes) and that extend in the vehicle body longitudinal direction, are combined integrally. A block portion 79, that is at the vehicle transverse direction outer side and the upper portion side, is fastened and fixed by the bolts 66 and the weld nuts 68 to the outer panel 64 of the rocker 60. Due thereto, the outer member 76 is disposed at the vehicle body lower side of the rocker 60.

Further, a convex portion 75A, that projects-out toward the vehicle transverse direction outer side, is formed at a block portion 75 that is at the vehicle transverse direction outermost side and at the lower portion side of the inner member 72. Further, a concave portion 77A, that is concave toward the vehicle transverse direction outer side, is formed at the boundary portion between a block portion 77 and a block portion 78 that are at the vehicle transverse direction inner side and the lower portion side of the outer member 76, so as to permit the convex portion 75A (so as to not contact the convex portion 75A).

This concave portion 77A is fit-together with (contacts) the convex portion 75A when the outer member 76 moves toward the inner member 72 side due to a side collision of the vehicle, and can efficiently transmit a portion of the inputted collision load from the outer member 76 to the inner member 72. Namely, there is a structure in which the outer member 76 and the inner member 72 become integral and can plastically deform (be crushed) toward the vehicle transverse direction inner side.

Operation of the vehicle battery mounting structure 10 that has the above-described structure is described next. Namely, description is given of operation in a case in which the vehicle side-collides with a pole P (an obstacle) that is, for example, made of metal and is solid cylindrical (or hollow cylindrical) and extends in the vertical direction, as shown in FIG. 4.

Figure 4:
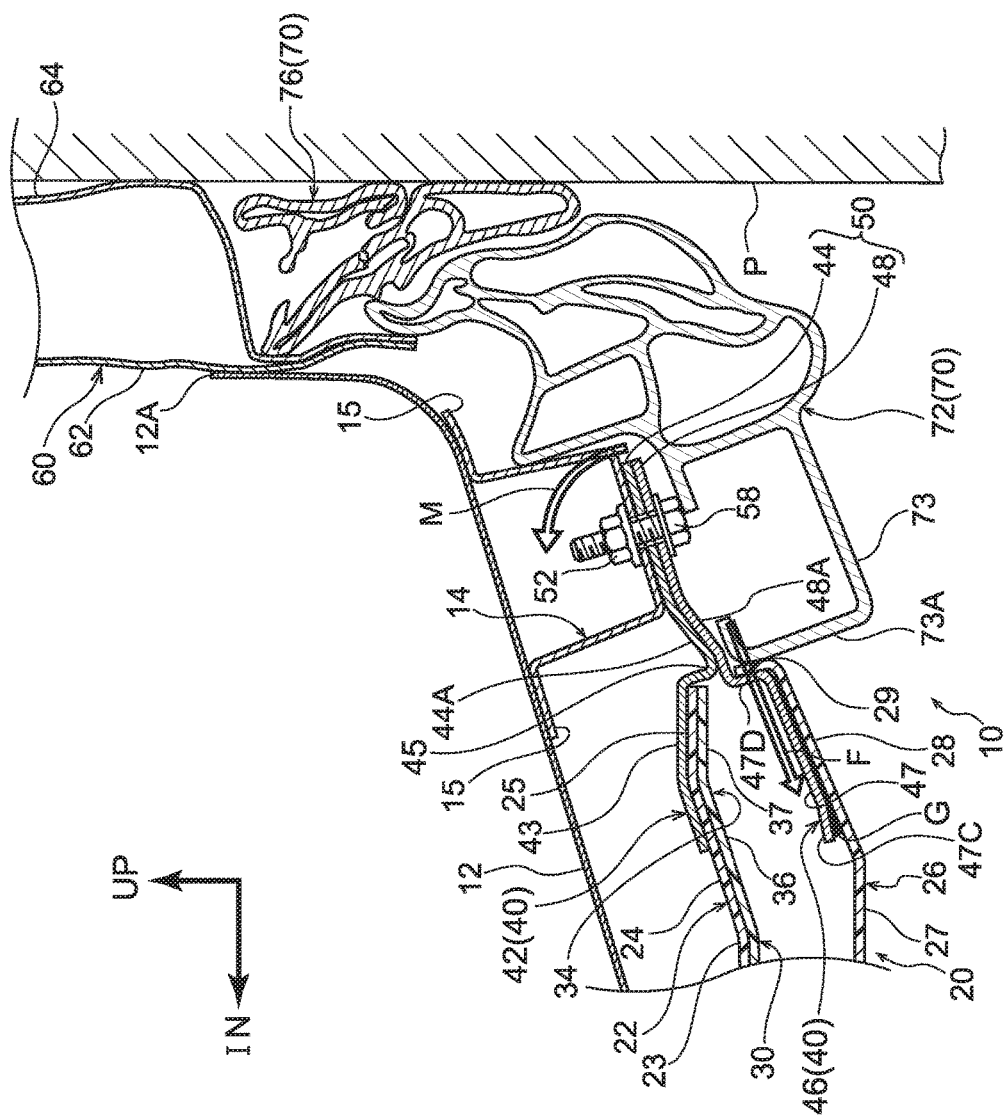
FIG. 4 is a front sectional view showing a state in which a vehicle, that is provided with the vehicle battery mounting structure relating to the present embodiment, side-collides with a pole.

As shown in FIG. 4, in a case in which the vehicle side-collides with the pole P, an excessive collision load that is directed toward the vehicle transverse direction inner side is inputted to the rocker 60 and the energy absorbing member 70. When collision load is inputted from the vehicle transverse direction outer side, the rocker 60 moves while plastically deforming toward the vehicle transverse direction inner side, and absorbs a portion of this inputted collision load, and transmits a portion of the remaining collision load to the floor panel 12.

When a portion of the collision load is transmitted to the floor panel 12, the vehicle transverse direction outer side end portion of this floor panel 12 turns-up, and the vehicle transverse direction outer side end portion of the under member 14, that is fixed to the bottom surface of the floor panel 12, is moved toward the vehicle body upper side. Thereupon, a bending moment M whose axial direction is the vehicle body longitudinal direction is inputted to the flange portion 50 of the ductile member 40 that is fastened and fixed to this under member 14.

Namely, force that is such that the flange portion 50 bends upward with the boundary portion 45 between the upper main body portion 43 and the upper flange portion 44 being the fulcrum (i.e., that is such that the vehicle transverse direction outer side end portion of the flange portion 50 is moved toward the vehicle body upper side), is applied to the flange portion 50 (the upper flange portion 44 and the lower flange portion 48) of the ductile member 40 that is fastened and fixed to the under member 14.

Here, the flange portion 50 (the ductile member 40) is ductile because it is molded from a metal (a high tensile steel plate or an ultra-high tensile steel plate). Further, the inclined portions 44A, 48A, that head from the vehicle transverse direction outer upper side toward the vehicle transverse direction inner lower side, are formed at the upper main body portion 43 side of the upper flange portion 44 and the lower main body portion 47 side of the lower flange portion 48 that structure the flange portion 50, and further toward the vehicle transverse direction outer side than the battery frame 20.

Accordingly, it is easy for the flange portion 50 to bendingly deform toward the vehicle body upper side with the boundary portions 45, 49 being the fulcrum. Accordingly, the bending moment M that is inputted to the flange portion 50 is absorbed efficiently by the bending deformation of the flange portion 50 toward the vehicle body upper side, and transmission thereof to the battery frame 20 is suppressed or prevented. Namely, at the time of a side collision of the vehicle, the stress load that is applied from the under member 14 via the flange portion 50 to the battery frame 20 can be reduced or eliminated.

Further, because the flange portion 50 is ductile, there is no concern that the flange portion 50 will be broken merely by the flange portion 50 being bendingly deformed toward the vehicle body upper side (breakage of the flange portion 50 is suppressed or prevented).

Therefore, there is no concern that the battery frame 20 will separate from the under member 14, and there is no concern that the fuel cell stack 16 will drop-off from the vehicle.

On the other hand, when collision load is inputted from the vehicle transverse direction outer side, the energy absorbing member 70 (the outer member 76 and the inner member 72) moves while plastically deforming toward the vehicle transverse direction inner side, and absorbs a portion of this inputted collision load, and transmits a portion of the remaining collision load to the under member 14 and the battery frame 20.

Here, the comparative example shown in FIG. 7 is described. In a vehicle battery mounting structure 100 relating to this comparative example, the inclined wall 28 is not formed at the vehicle transverse direction outer side end portion of a lower frame 126. Namely, only a side wall portion 129, that extends substantially perpendicularly upward, is formed at the vehicle transverse direction outer side end portion of a bottom plate 127.

Further, an overhanging portion 147B at a lower main body portion 147 of a lower ductile member 146 juts-out toward the vehicle transverse direction inner side along the horizontal direction, and is joined to the top surface of the bottom plate 127. A side wall portion 147D at the lower main body portion 147 extends substantially perpendicularly upward, and is joined to the inner surface of the side wall portion 129.

Figure 7A:
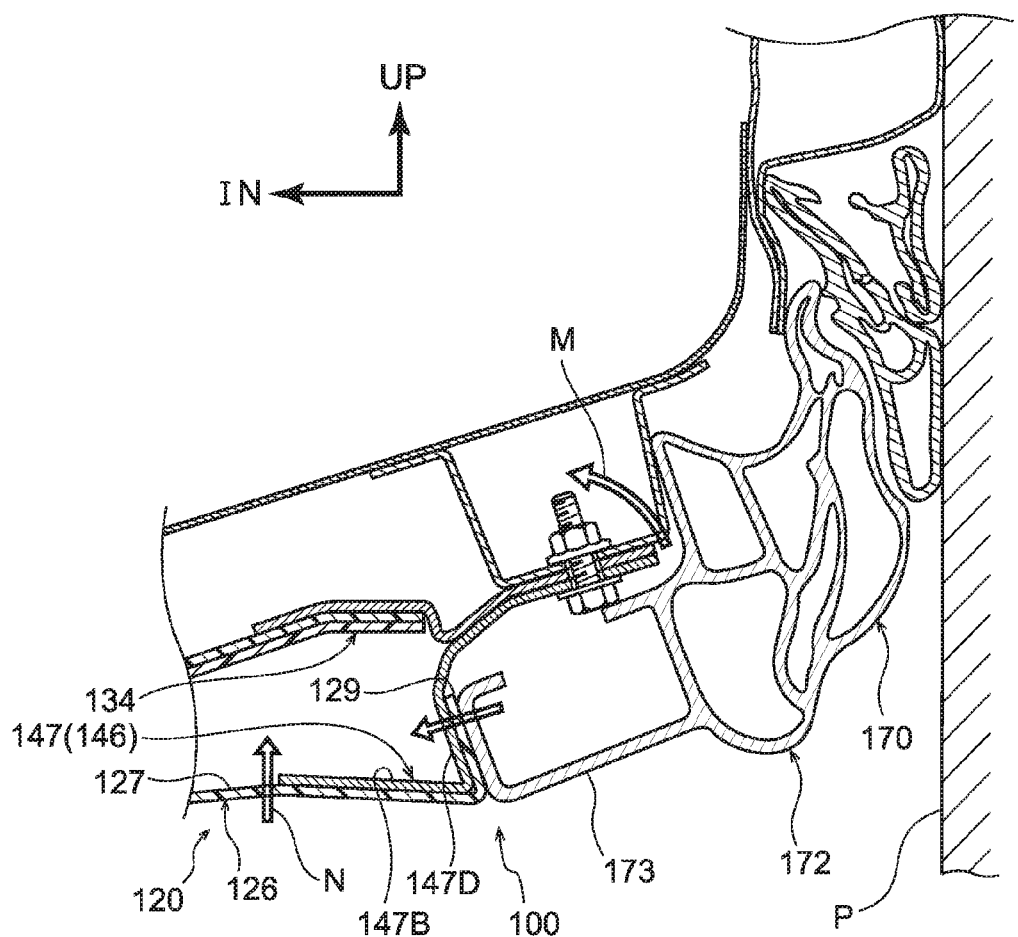
FIG. 7A is a front sectional view showing a state in which a vehicle, that is provided with a vehicle battery mounting structure relating to a comparative example, side-collides with a pole.

Accordingly, when the vehicle side-collides with the pole P, there are cases in which, as shown in FIG. 7A, a block portion 173 at an inner member 172 of an energy absorbing member 170 that has plastically deformed hits the side wall portion 129 of the lower frame 126 while rotating due to the bending moment M, and, due thereto, pushes the upper end portion side of this side wall portion 129 toward the vehicle transverse direction inner side.

In this case, the side wall portion 129 and the side wall portion 147D deform so as to fall toward the vehicle transverse direction inner side, and there is the concern that a portion of the bottom plate 127, which portion is further toward the vehicle transverse direction inner side than the vehicle transverse direction inner side end portion of the overhanging portion 147B, will break. Namely, there is the concern that bending moment N that is directed upward (in the out-of-plane direction) will arise at a portion of the bottom plate 127 where the overhanging portion 147B does not exist and at which the yield strength suddenly changes, and that the battery frame 120 will break cross-sectionally.

Figure 7B:
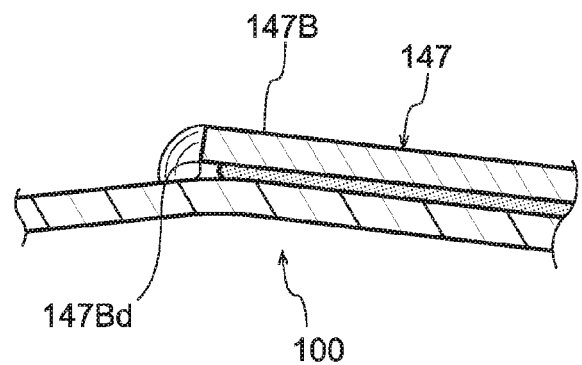
FIG. 7B is a front sectional view showing, in an enlarged manner, a portion of the vehicle battery mounting structure relating to the comparative example.

Moreover, in the case of the vehicle battery mounting structure 100 relating to this comparative example, when there is a water drop within a projecting portion 134, as shown in FIG. 7B, the state in which the water drop adheres in particular to a lower side ridgeline portion 147Bd at the vehicle transverse direction inner side end portion of the overhanging portion 147B is maintained. Therefore, there is the concern that rust due to galvanic corrosion will arise at this lower side ridgeline portion 147Bd. Accordingly, in the vehicle battery mounting structure 100 relating to this comparative example, a countermeasure, such as coating a sealer on the vehicle transverse direction inner side end portion of the overhanging portion 147B, or the like, is needed.

In contrast, in the vehicle battery mounting structure 10 that relates to the present embodiment, as shown in FIG. 4, the inclined wall 28, that is inclined from the vehicle transverse direction inner lower side toward the vehicle transverse direction outer upper side (from the vehicle transverse direction outer upper side toward the vehicle transverse direction inner lower side), is formed at the vehicle transverse direction outer side at the lower frame 26 of the battery frame 20, and the side wall portion 29, that extends substantially perpendicularly upward, is formed at the vehicle transverse direction outer side end portion of this inclined wall 28.

Further, the overhanging portion 47B of the lower main body portion 47 as well is inclined at the same angle as this inclined wall 28, and the side wall portion 47D, that extends substantially perpendicularly upward, is formed at the vehicle transverse direction outer side end portion of the overhanging portion 47B. Namely, the overhanging portion 47B is joined to the top surface of the inclined wall 28, and the side wall portion 47D is joined to the inner surface of the side wall portion 29.

Accordingly, even if the block portion 73 at the inner member 72 of the energy absorbing member 70 that has plastically deformed, hits the side wall portion 29 of the lower frame 26 while rotating due to the rotating moment M, this collision load (shown by arrow F in FIG. 4) is efficiently transmitted toward the vehicle transverse direction inner side along the in-plane direction (the compressing direction) of the inclined wall 28 (the lower frame 26) and the overhanging portion 47B (the lower main body portion 47). Therefore, this side wall portion 29 falling toward the vehicle transverse direction inner side can be suppressed or prevented.

Due thereto, a portion of the collision load, that is inputted at the time of a side collision of the vehicle and is directed toward the vehicle transverse direction inner side (shown by arrow F), can be efficiently transmitted from the side wall portion 29 and the side wall portion 47D to the end surface portion 38 of the core frame 30, i.e., the plural row of convex portions 33, and can be efficiently absorbed by the plural row of convex portions 33, and can be efficiently absorbed by the bottom plate 27 as well.

Moreover, the standing portions 47C, that separate from the inclined wall 28 while heading toward the vehicle transverse direction inner side, are formed at portions of the overhanging portion 47B, and the adhesive that is for joining the standing portions 47C to the inclined wall 28, becomes thicker while heading toward the vehicle transverse direction inner side. Therefore, a portion of the collision load, that is transmitted by the inclined wall 28 and the overhanging portion 47B, can be absorbed by the adhesive G while a sudden change in the yield strength due to the disappearing of the overhanging portion 47B is suppressed. Accordingly, the collision load that is transmitted to the bottom plate 27 can be reduced, and cross-sectional breakage of the battery frame 20 (breakage of the bottom plate 27) can be suppressed as much as possible or prevented.

Further, the standing portions 47C are inclined from the vehicle transverse direction outer upper side toward the vehicle transverse direction inner lower side with respect to the horizontal direction, and the lower side ridgeline portions 47Cd at the vehicle transverse direction inner side end portions thereof are apart from the inclined wall 28 by an amount corresponding to the maximum thickness H of the adhesive G Therefore, even if there is a water drop within the projecting portion 34, that water drop runs-off the top surface of the standing portion 47C, and it is difficult for the water drop to adhere to the top surface of the standing portion 47C and the lower side ridgeline portion 47Cd (see FIG. 3). Accordingly, it is difficult for rust due to galvanic corrosion to arise at the top surface of the standing portion 47C and the lower side ridgeline portion 47Cd.

Namely, at the vehicle battery mounting structure 10 that relates to the present embodiment, a countermeasure such as the coating of a sealer at the vehicle transverse direction inner side end portions of the standing portions 47C, or the like, is not needed. Note that the adhesive G may be made to bulge-out from the vehicle transverse direction inner side end portions of the standing portions 47C, and the vehicle transverse direction inner side end portions (in particular, the lower side ridgeline portions 47Cd) of the standing portions 47C may be covered by this adhesive G that has bulged-out and swollen (see FIG. 5, FIG. 6). Due thereto, the generation of rust caused by galvanic corrosion at, in particular, the lower side ridgeline portions 47Cd of the standing portions 47C can be suppressed or prevented more.

Further, at this time, the plate members 80, that project-out from the vehicle transverse direction inner side end portions of the standing portions 47C toward the vehicle transverse direction inner side, are provided at the top surfaces of the standing portions 47C. Therefore, some of the mound of the adhesive G that has bulged-out from the vehicle transverse direction inner side end portion of the standing portion 47C can be held down by this plate member 80. Namely, even within a closed cross-sectional shape at which, after adhesion, it is difficult to smooth-out the adhesive G and form a path for water drops, a path for water drops can be formed.

Accordingly, even if there is a water drop within the projecting portion 34, the water drop runs-off from the top surface of the standing portion 47C and the top surface of the plate member 80 onto the top surface of the lower frame 26, and is discharged to the exterior of the battery frame 20 from the through-hole 26A that is formed in the lower frame 26. Accordingly, the generation of rust, that is due to galvanic corrosion, at the top surface of the standing portion 47C can be suppressed or prevented more.

Note that it can also be thought to form a through-hole, that passes-through the standing portion 47C and the inclined wall 28, and make this through-hole be a drainage hole. However, in this case, at the time of joining the standing portions 47C to the inclined wall 28 by the adhesive grommets (not shown), for making it such that the adhesive G does not close-off the drainage holes, are needed, and work for scraping-out the adhesive G that blocks the drainage holes is needed. Further, there is the concern that rust that is due to galvanic corrosion will arise at the edges of the through-holes (drainage holes) that are formed in the standing portions 47C.

Accordingly, it is desirable to not form a through-hole (drainage hole) that passes-through the standing portion 47C and the inclined wall 28. If such drainage holes are not formed, work processes for scraping-out the adhesive G that blocks the drainage holes, and the like, can be rendered unnecessary, and therefore, the workability at the time of manufacturing the battery frame 20 can be improved. Further, the occurrence of a problem such as rust due to galvanic corrosion being able to be seen from the exterior of the battery frame 20 (a deterioration in appearance) can be prevented.

Further, the overhanging portion 47B at the lower main body portion 47 of the lower ductile member 46 is nipped and fixed by the core frame 30 (the main body portion 32) and the lower frame 26 (the bottom plate 27). Accordingly, at the time of a side collision of the vehicle, even if the flange portion 50 bendingly deforms toward the vehicle body upper side, the overhanging portion 47B of the lower main body portion 47 being detached from the core frame 30 and the lower frame 26 is suppressed or prevented.

Note that, as shown in FIG. 4, in a case in which the flange portion 50 bendingly deforms toward the vehicle body upper side, force that is directed toward the vehicle body upper side is applied to the vehicle transverse direction outer side end portion of the upper flange portion 44, and therefore, force that is directed toward the inclined wall 24 side (pushes-down) is applied to the upper main body portion 43. Namely, it is difficult for force, that is in a direction of detaching from the inclined wall 24, to be applied to the upper main body portion 43, and this detachment from the inclined wall 24 is suppressed or prevented.

Further, a concave portion (not illustrated), that is substantially "U" shaped (the boundary portion 45 is substantially circular arc shaped as seen in cross-section) or substantially "V" shaped as seen from the vehicle body longitudinal direction, may be formed in the upper main body portion 43 side of the upper flange portion 44 further toward the vehicle transverse direction outer side than the battery frame 20, i.e., in the boundary portion 45 between the upper main body portion 43 and the upper flange portion 44.

In accordance therewith, it becomes even easier for the vehicle transverse direction outer side end portion of the flange portion 50 to bendingly deform toward the vehicle body upper side with the boundary portion 45 between the upper main body portion 43 and the upper flange portion 44, i.e., the concave portion, being the fulcrum. Therefore, the stress load that is applied from the under member 14 via the flange portion 50 to the battery frame 20 can be further reduced or eliminated.

Although the vehicle battery mounting structure 10 relating to the present embodiment has been described above on the basis of the drawings, the vehicle battery mounting structure 10 relating to the present embodiment is not limited to the illustrated structure, and changes in the design thereof can be made appropriately within a scope that does not depart from the gist of the present invention. For example, the ductile member 40 is not limited to a member that is molded from a high tensile steel plate or an ultra-high tensile steel plate, and may be molded from an aluminum alloy or iron or the like that has hardness of a certain extent.

Further, the flange portions 50 of the ductile member 40 are not limited to structures that are fastened and fixed to the under members 14 that are joined and fixed to the bottom surface of the floor panel 12. For example, the flange portions 50 may be structures that are fastened and fixed by unillustrated brackets or the like that are joined and fixed to the bottom surface of the floor panel 12 or the bottom surfaces of the under members 14. Namely, the flange portions 50 of the ductile member 40 may be structures that are joined indirectly to the floor panel 12 or the under members 14.

Moreover, the upper main body portion 43 and the lower main body portion 47 of the ductile member 40 are not limited to portions that are joined by an adhesive to the battery frame 20, and, for example, may be structures that are joined by joining equipment such as rivets or the like. Further, the battery frame 20 in the present embodiment is not limited to a frame that supports the fuel battery stack 16.

The invention claimed is:

1. A vehicle battery mounting structure, comprising:
  a battery frame lower member, the battery frame lower member being made of resin, the battery frame lower member being disposed at vehicle transverse direction inner sides of energy absorbing members provided at a lower side of a floor panel, and the battery frame lower member, together with a battery frame upper member, structuring a battery frame, and the battery frame lower member supporting a battery;
  a lower ductile member having:
    a lower main body portion, the lower main body portion being joined to vehicle transverse direction outer side end portions of the battery frame lower member, and
    lower flange portions, the lower flange portions being fixed to a bottom surface side of the floor panel; and
  inclined walls, the inclined walls being formed at the vehicle transverse direction outer side end portions of the battery frame lower member, and the inclined walls being obliquely inclined relative to a bottom plate of the battery frame lower member toward the lower ductile member.

2. The vehicle battery mounting structure of claim 1, wherein portions of the lower main body portion are made to be standing portions, the standing portions gradually separate from the inclined walls, and regions between the inclined walls and the standing portions are filled-in and joined by an adhesive.

3. The vehicle battery mounting structure of claim 2, wherein plate members are provided at the standing portions, the plate members each projecting-out from an end of the standing portions toward the battery frame lower member.

4. The vehicle battery mounting structure of claim 1, wherein vertical walls that extend upward are formed at vehicle transverse direction outer side end portions of the inclined walls.

5. The vehicle battery mounting structure of claim 1, further comprising an upper ductile member having an upper main body portion and upper flange portions, the upper main body portion being joined to vehicle transverse direction outer side end portions of the battery frame upper member, and the upper flange portions, together with the lower flange portions, being fixed to the bottom surface side of the floor panel,
  wherein inclined portions are formed at the upper main body portion sides of the upper flange portions, and the inclined portions are obliquely inclined relative to the bottom plate of the battery frame lower member toward the lower ductile member.

\* \* \* \* \*